US009639608B2

(12) United States Patent
Freeman

(10) Patent No.: US 9,639,608 B2
(45) Date of Patent: May 2, 2017

(54) COMPREHENSIVE USER/EVENT MATCHING OR RECOMMENDATIONS BASED ON AWARENESS OF ENTITIES, ACTIVITIES, INTERESTS, DESIRES, LOCATION

(71) Applicant: Daniel Freeman, Tampa, FL (US)

(72) Inventor: Daniel Freeman, Tampa, FL (US)

(*) Notice: Subject to any disclaimer, the term of this patent is extended or adjusted under 35 U.S.C. 154(b) by 242 days.

(21) Appl. No.: 14/211,867

(22) Filed: Mar. 14, 2014

(65) Prior Publication Data
US 2014/0365484 A1 Dec. 11, 2014

Related U.S. Application Data

(60) Provisional application No. 61/794,283, filed on Mar. 15, 2013.

(51) Int. Cl.
*G06F 17/30* (2006.01)
*H04W 4/20* (2009.01)
*G06Q 50/00* (2012.01)

(52) U.S. Cl.
CPC ....... *G06F 17/30861* (2013.01); *G06Q 50/01* (2013.01); *H04W 4/206* (2013.01)

(58) Field of Classification Search
CPC ................................................ G06F 17/30861
USPC ........................................................ 707/736
See application file for complete search history.

(56) References Cited

U.S. PATENT DOCUMENTS

| 8,208,905 | B2* | 6/2012 | Lee ................... | G06F 17/30867 455/403 |
| 8,700,540 | B1* | 4/2014 | Zambrano ............. | G06Q 50/01 705/319 |
| 2008/0154696 | A1* | 6/2008 | Spiegelman ...... | G06F 17/30867 705/7.32 |
| 2009/0287687 | A1* | 11/2009 | Martire ................. | G06Q 30/02 |
| 2010/0312644 | A1* | 12/2010 | Borgs .................... | G06Q 10/10 705/14.55 |
| 2010/0325205 | A1* | 12/2010 | Murphy ................. | G06Q 10/10 709/204 |

OTHER PUBLICATIONS

Jie Bao; Yu Zheng; Mohamed F. Morbel; "Location-based and Preference-Aware Recommendation Using Sparse Geo-Social Netowrking Data", Department of Computer Science & Engineering, Univ. of Minnesota, Microsoft Research Asian, No. 5. (2012).*

* cited by examiner

*Primary Examiner* — Sheree Brown

(57) ABSTRACT

A method for comprehensive user/event matching or recommendations is described. The method includes a network environment which receives one or more pieces of user data, event data, or social data from users or third party data sources, determining the relevance of the data for users, and displaying the identified data to user in the form of recommendations.

12 Claims, 10 Drawing Sheets

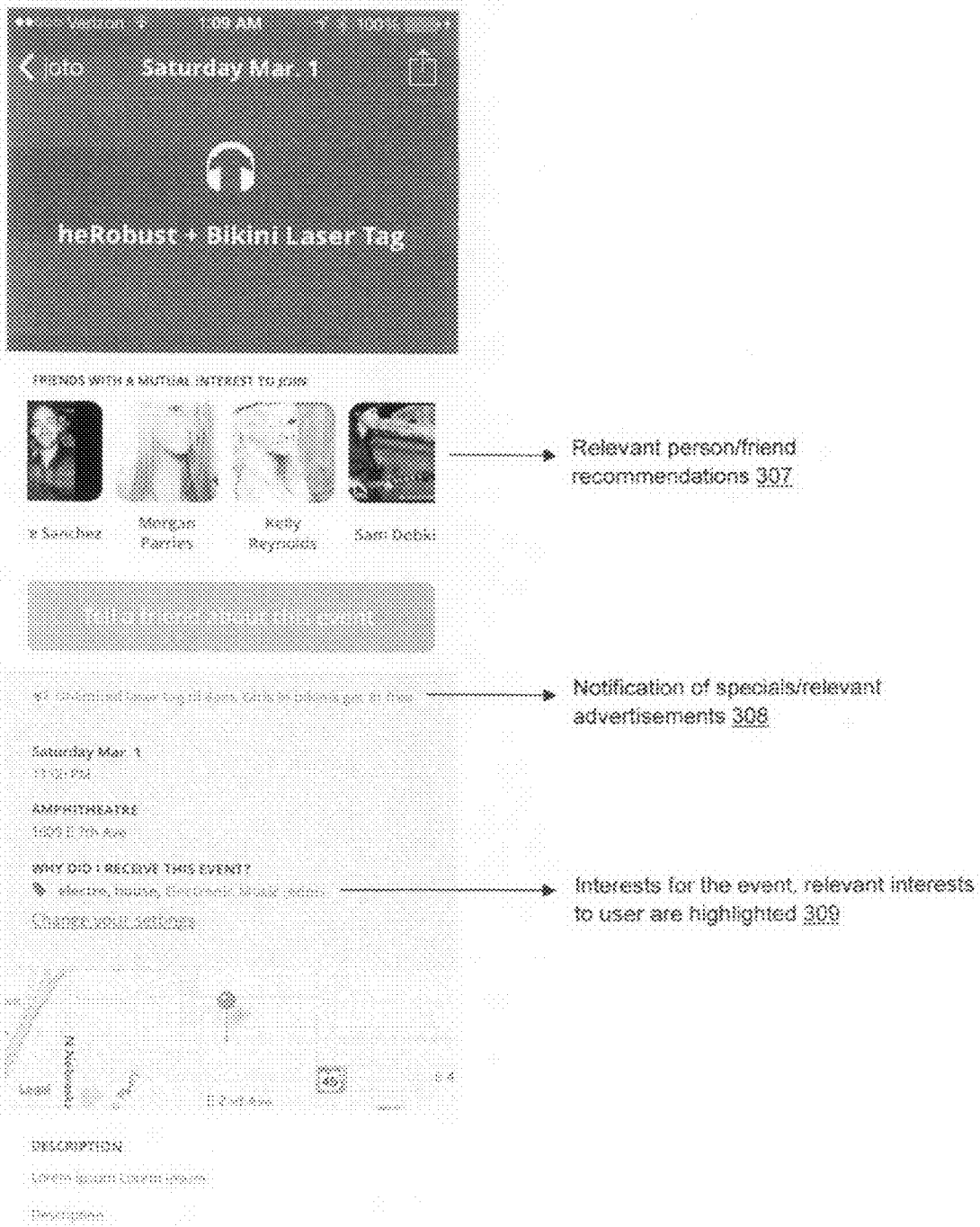

COMPREHENSIVE USER/EVENT MATCHING OR RECOMMENDATIONS BASED ON AWARENESS OF ENTITIES, ACTIVITIES, INTERESTS, DESIRES, LOCATION

CROSS-REFERENCE TO RELATED APPLICATIONS

The present application incorporates by reference U.S. Provisional Patent Application Ser. No. 61/794,283 filed on Mar. 15, 2013 for "Comprehensive User/Event Matching or Recommendations Based on Awareness of Entities, Activities, Interests, Desires, Location."

BACKGROUND

Field of the Invention

The invention relates generally to social networking and, in particular, to systems and methods for serving meaningful "real-world" recommendations.

Description of the Related Art

Social networking services include social utilities that track and enable connections between users (including people, businesses, and other entities), which have become prevalent in recent years. In particular, social networking services allow users to communicate more efficiently information that is relevant to their friends or other connections in the social networking service. Social networking services typically incorporate a system for connecting users to content that is likely to be relevant to each user. For example, users may be grouped according to one or more common attributes in their profiles, such as geographic location, employer, job type, age, music preferences, page likes, followers, or other attributes. Users of the social networking service and/or external parties can then use these groups to customize or target information delivery so that information that might be of particular interest to a group can be communicated to that group.

Furthermore, advertisers wishing to use members' affinities, or common attributes, as targeting criteria for advertisements have difficulty placing their ads in contextually relevant areas, a problem called "ad blindness." As a result, members are inundated with advertisements for products unrelated to the context of what the members are currently viewing. Thus, these ads are largely ignored by members of a social network.

Despite prior art designed to increase the relevance of this information, the systems and methods of the prior art do not achieve the desired outcome, and continue to overwhelm the user with large amounts of non-relevant information. Additionally, methods for indicating user interests including page likes and followers on social networks today are largely comprised of non-useful and non-meaningful data for real-world (offline) interactions, thus the power for directing content, recommendations, and advertising that promotes real world interactions is greatly limited.

SUMMARY

Brief Summary of Invention

A recommendation engine that connects users with the things that they find important. This creates a real-world social network promoting the connection of people in meaningful interactions based on the context of their interests and behavior.

Useful matches or recommendations of other users (1 or more) and events (one-time, repeating, deal-based, or general), including any combinations (users with users, users with events, events with users, events with events).

Based on interest (as indicated by a user or friend, inferred, or profiled/guessed) or intent (indicated or guessed), location (current place, or a remote place, where one plans to be or would like to be), compatibility.

Towards the promotion of "real world"/offline activities or connections.

Connecting brand/businesses/advertisers' events with the users who, based on a set of algorithms, may find the recommendation of interest.

Data received or gathered from external systems, public information, or from the invention itself.

In one embodiment, these matches or recommendations are displayed in a feed on the web, a mobile device, by text message, or in an email.

In another embodiment in an augmented reality application, such as a pair of glasses or contact lenses projecting a data layer on top of real objects in the field of vision.

Recommendations can be conveyed in any means whereby such data can be relayed, such as over internet/intranet, via a dedicated or within a separate mobile/web/tablet application, via augmented reality layers, email, bluetooth, in-car audio/video/display systems, mobile tethering, mobile hotspots, near-field communication, or any transmission that offers relevant real-world content with regard to any of the items indicated hereto.

BRIEF DESCRIPTION OF THE DRAWINGS

FIG. 5 is an exemplary screen shot of one embodiment of a feed of recommendations on a mobile device FIG. 6 is an exemplary screen shot of one embodiment of a details view for one recommendation, on a mobile device FIG. 7 is an early mockup screen shot of one embodiment of a view allowing users to specify interest preferences FIG. 8 is an early mockup screen shot of one embodiment of a feed of recommendations on a mobile device FIG. 9 is an early mockup screen shot of one embodiment of a settings menu allowing users to specify general preferences for recommendations.

Figure 1:
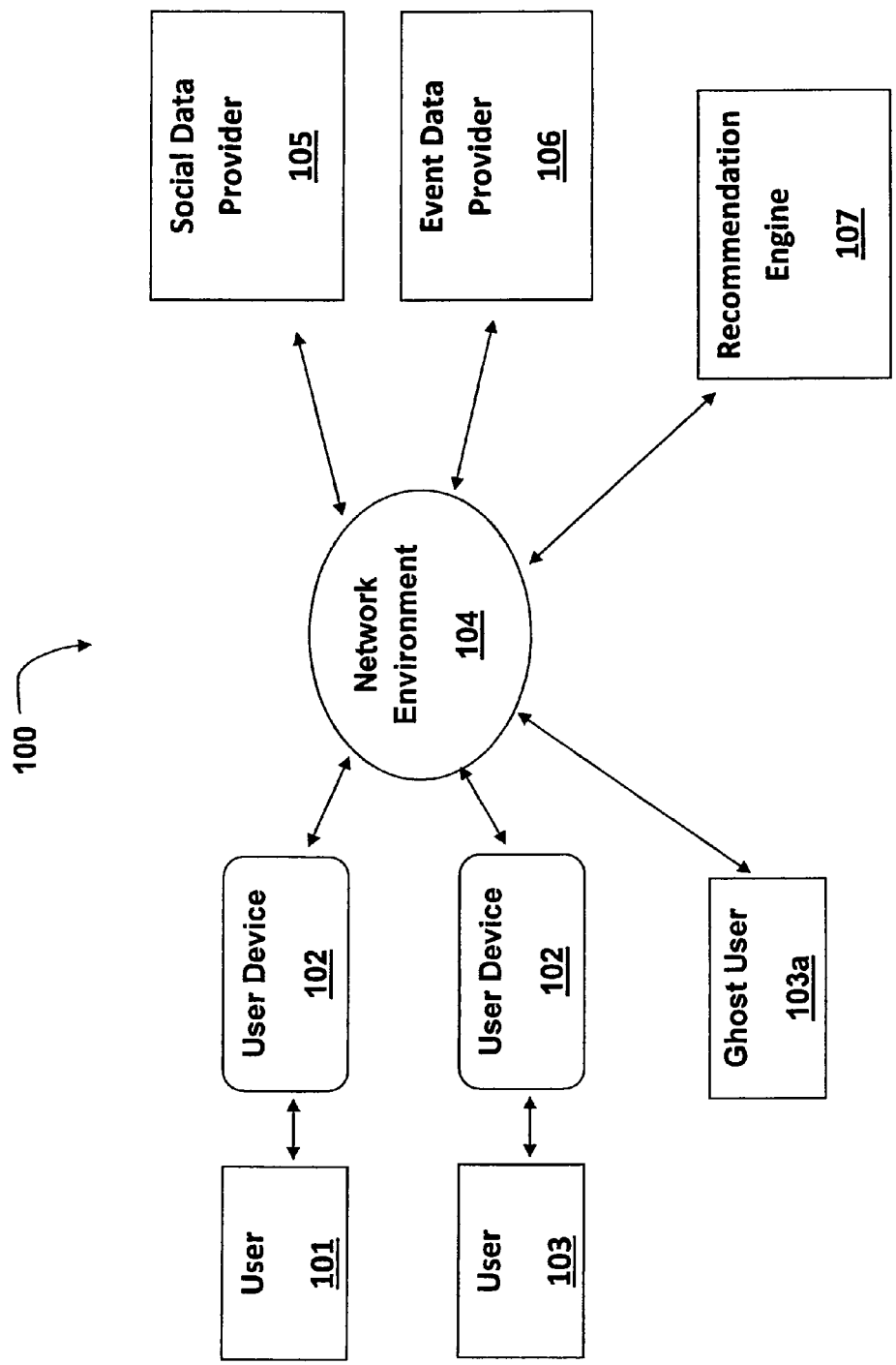
FIG. 1 illustrates an exemplary environment for generating relevant recommendations in a social network environment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Detailed Description of Invention

A comprehensive matching system for matching or recommending users and events, to create a "real-world" social network—the content delivered from this system could be outputted through any means whereby electronic data is delivered, for example in a feed on the web, a mobile device, by text message, in an email, through augmented reality in the field of vision, or in any means whereby such data can be relayed, such as over internet/intranet, via a dedicated—or within a separate—mobile/web/tablet application, via augmented reality layers, email, bluetooth, in-car audio/video/display systems, mobile tethering, mobile hotspots, near-field communication, other outputs as known in the art, or any transmission that offers relevant real-world content with regard to any of the items indicated hereto.

To create a novel and meaningful experience, in one embodiment of the system, multiple steps of information gathering and contextualization occur including:

User interest or intent data through explicit input by self or friend, inferred by interactions within the system, and/or profiled/guessed based on similarities to other users or other available data.

Current, future, or desired location, based on user provided input, inferred using data provided by a front-end system/application, or guessed based on other information, such as IP address.

Entity and event/activity/experience awareness to understand possibilities of things to do, and the entities associated with those activities to understand which user(s) should receive the specific recommendation.

Involves an ontology/graph/model of several layers of possible interests and interest relations, in one embodiment using multi-step natural language contextualization system to take diverse inputs from disparate sources online and offline (external systems, public information, or from the invention itself) to understand and "tag" accordingly.

This information is used to recommend or match, in one embodiment of the system using matching algorithms, statistical models, or other data analysis techniques the following combinations: users with users, users with events, events with users, events with events toward the promotion of "real world"/offline activities or connections.

Users could be a single or group of users, potentially with compatibility considerations from user data provided or inferred/guessed.

Events could be one-time events, such as a concert, repeating such as a weekly special, a deal-based event such as an expiring coupon/special promotion, or a general event such as "hike in the park".

Certain embodiments include (each user-provided, inferred, or profiled/guessed): varying importance of weighting for recommendations to receive more/less and nearer/farther recommendations, user importance ratings as positives (likes) and as negatives (dislikes).

Automatic awareness and changes to system parameters based on new habits, user located in a new place (one they do not typically go to), actively moving, and others.

Different modes (either user or system induced) to receive different numbers/types of recommendations for events and users, as well as times and places when the system will be on/off automatically.

Subscription-like recommendations or matches such that "tastemaker" or popular users curate and can be followed for their feeds/playlists/activity.

Connecting brands'/businesses'/advertisers' events with the users who, based on a set of algorithms, may find the recommendation of interest.

Could occur on a one-time basis, similar to a notification, or a recurring/continual basis, similar to an advertising campaign.

FIG. 1 illustrates an exemplary system for generating relevant recommendations in a network environment 104. One or more users, such as users 101 at user devices 102, are coupled to a network environment 104. The network environment 104 can query data from social data provider 105 and/or event data provider 106. All data received by the network environment 104 is then processed by recommendation engine 107, which may filter the information according to thresholds set on the inputs to recommendation engine 107 (as more fully described in FIG. 2), and generally the guidance of self-stated and/or discovered/inferred interests. It sends recommendations believed that user 101 will find relevant given aforementioned interests, to user device 102. Recommendations provided may include events, activities, experiences, people, deals, specials, desire matchups, and/or advertisements for user 101 alone, or include friends/people in said recommendations who may have a corresponding interest. This mutual interest could be realized directly by users 101 and 103, not necessarily friends, because of their direct involvement on the same network environment 104, or explicitly between users 103 and "ghost" user 103a—a friend who has not subscribed or directly provided information to network environment 104, but whose data was obtained because of user 103's engagement with the network environment 104 or social data provider 105.

One or more users such as user 101 and user 103, connect to network environment 104 through user device 102. User device 102 may comprise of a web, mobile/tablet application, augmented reality layers, email, bluetooth, in-car audio/video/display systems, mobile tethering, mobile hotspots, near-field communication, other outputs as known in the art, or any transmission that offers relevant real-world content with regard to any of the items indicated hereto.

Network environment 104 consists of one or more servers, with one or more hard drives, an amount of memory, and other hardware specifications known in the art necessary to receive and transmit information appropriately to user device 102. Network environment 104 may be accessed via the internet, a wireless or wired network such as a mobile device carrier network or any other network that can be used for communication between a server and client.

Social data provider 105 may comprise any user or entity that provides social relationship or interest data, communication services, dating services, company intranets, and so forth. Event data provider 106 may comprise any user or entity that provides structured or unstructured data about events, activities, experiences, people, deals, specials, desire matchups, and/or advertisements for recommendation engine 107 to recommend. This may occur via Application Programming Interfaces (API's), data scraping, user additions, or inferred by the network environment using methods such as locations/interests of users, and so forth.

Figure 2:
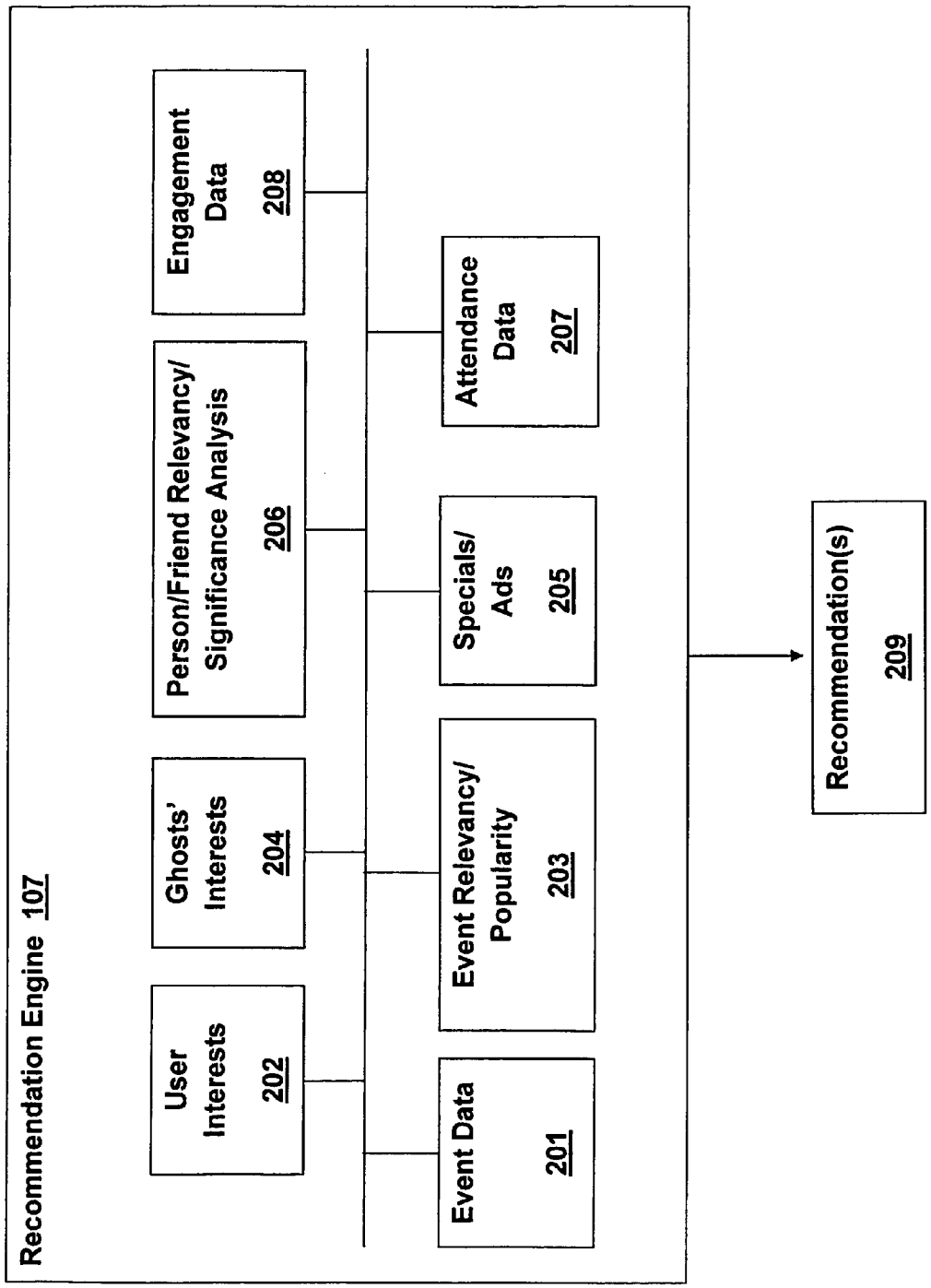
FIG. 2 is a block diagram of an exemplary recommendation engine.

Referring now to FIG. 2, a block diagram of an exemplary recommendation engine 107, such as the recommendation engine 107 shown in FIG. 1. A user-interests database 202 is provided for storing interest and other user data associated with each of the users, such as the user 101 associated with user device 102. When a user 101 subscribes to services provided by the network environment 104, a user profile may be generated for user 101. For example, user 101 may specify interests explicitly, and through engagement with the service, implicitly specify other interests. For example, the user 101 may select interests 'electronic music', 'yoga', and 'sushi'. Furthermore by frequently viewing and attending events/experiences associated with 'yoga' and 'electronic music', the user also provides meaningful data about true interests, and provides meaningful data about 'sushi' a potentially less relevant interest. For each input to recommendation engine 107, thresholds may exist to define and refine recommendations 209. For example, if event data 201 contained an event 'Sushi and Yoga Night', this may trigger a threshold for user to receive that event. However, one or more user or system-defined criterion may limit or further refine the threshold. For example, a certain number of ghost users may be necessary to show the event, or the event may have to be within a certain distance of the user's location.

According to some embodiments, the user profile is created outside of the network environment 104 and provided to or accessed by the network environment 104. Alternatively, the user interests 202 may be located remotely and accessed by the network environment 104.

Optionally, if user 103 engages network environment 104 in such a manner where social relationship data is available, ghost users 103a may be created. These ghost users 103a may contain information about user 103's relationships with these ghost users and their interests, known as ghosts' interests 204, so that recommendation engine 107 may recommend relevant ghosts using social thresholds, along with events/activities/experiences recommended by recommendation engine 107 through network environment 104.

Significance analysis 206 may be performed to determine which people or friends are most relevant to the potential recommendation, and to rank this relevancy in order to show most relevant people/friends before others. This analysis may consider factors such as user location, significance to each of the users of the overlapping interests for the particular recommendation, or any other thresholds regarding the inputs considered by the recommendation engine 107 to arrive at 209 recommendation.

Engagement data with the service—clicks, views, etc may also factor into recommendations 209 provided by recommendation engine 107 to network environment 104.

Categorized event data 201 can be considered by recommendation engine 107, narrowing down for the most relevant events, activities, experiences, people, deals, specials, desire matchups, and/or advertisements using relevancy popularity analysis 203. This relevancy analysis may include known or guessed information of the attendance/engagement numbers of a particular recommendation, the distance of the potential recommendation to the user's current, estimated, and/or anticipated location, the significance to the user of the interests belonging to the potential recommendation, or any other thresholds regarding the inputs considered by the recommendation engine 107 to arrive at 209 recommendation.

Relevant context-aware specials/advertisements 205 may be shown—to users nearby, potentially interested in the entity hosting a particular special/advertisement, and optionally including social recommendations with a particular special/advertisement.

Finally, previous attendance data 207 may be used to further determine user-interest relevancy for whether a specific recommendation should appear through network environment 104 to user 101/103 via user device 102.

The output of the recommendations engine 209 is then relayed to the network environment 104, where it exists for any amount of time before being sent to user 101 and/or 103 via user device 102. Recommendations 209 offered may be one or more, are not final, and can be further modified/refined at any time as a result of additional input received by the network environment 104 and thus recommendation engine 107. Recommendations 209 may include events, activities, experiences, people, deals, specials, desire matchups, and/or advertisements with/without corresponding people/friend recommendations, nearby the users current and/or future known/anticipated location.

Figure 3:
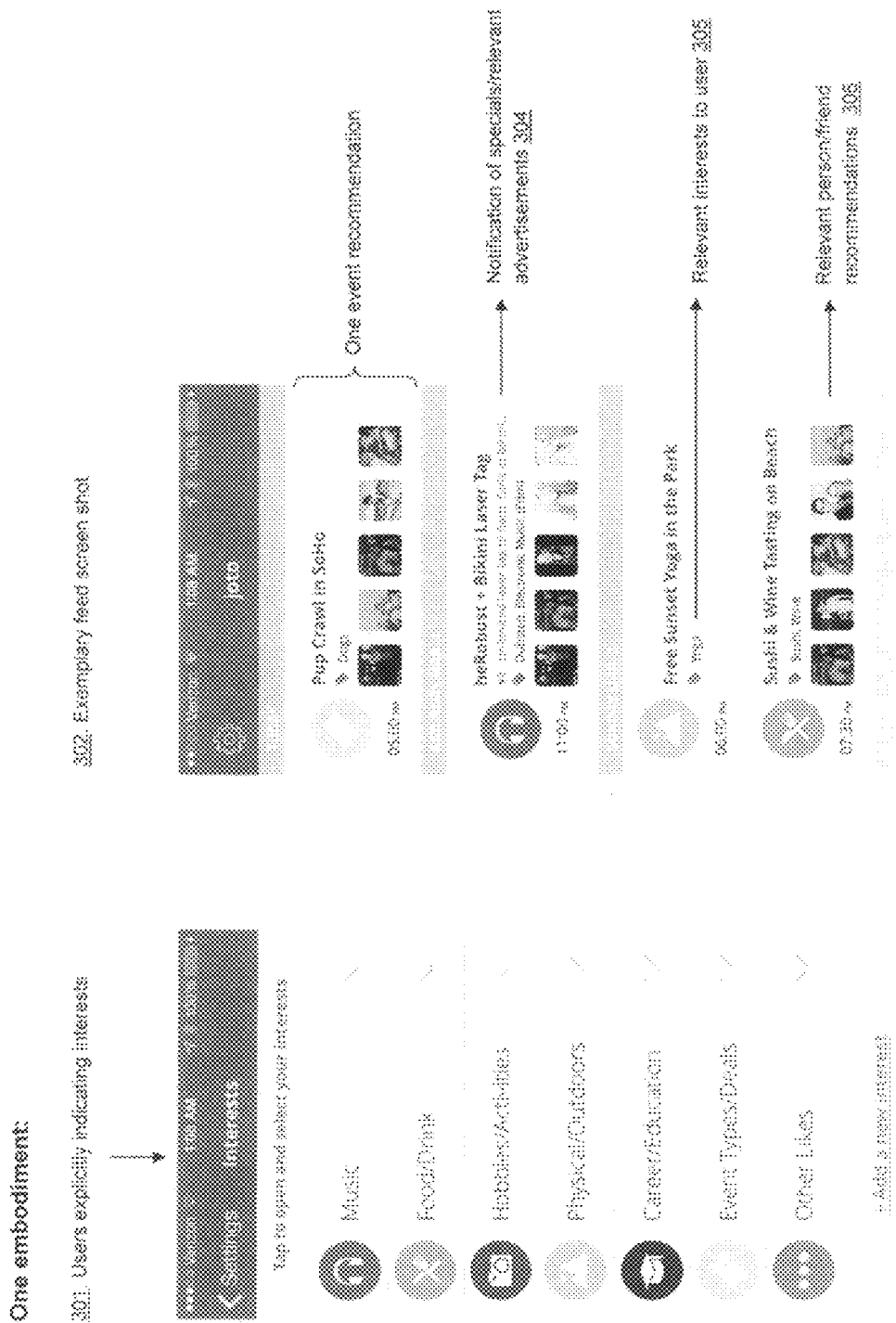
FIG. 3 is an exemplary screen shot of one embodiment of a feed of recommendations on a mobile device.

FIG. 3 is an exemplary screen shot of one embodiment of a 'feed' 302 of recommendations 209 from recommendation engine 107, displaying through the network environment 104 on a user device 102 to the viewing user 103. The user device 102 in this instance is a mobile phone. The exemplary screen shot 302 represents a display page showing four recommendations 209 to user 103, and including both ghost users 103a and network environment users 101. However, more or fewer than four items with or without ghost/network environment users may be displayed. The total number displayed may be limited by the significance analysis 206.

Interest indication 301 is one embodiment of a method whereby user 101 and/or 103 may provide user-interests 202 explicitly to network environment 104.

Various types of recommendations—events, activities, experiences, people, deals, specials, desire matchups, advertisements and/or other content may be displayed in the feed 302. In the exemplary screen shot shown in feed 302, nearby events for the weekend are displayed.

Interests relevant for the events displayed may be specified explicitly along subcategories of those shown in interests 301. For example 'dogs' and 'yoga' may be explicitly indicated by the user, which results in 2 of the events shown in feed 302—a 'Pup Crawl' and 'Free Sunset Yoga in the Park'.

In this exemplary screen shot 302, relevant interests to the user are filtered and shown 305 as part of the recommendation. Additionally, optional relevant person/friend recommendations may be displayed 306 if the users data allows for such recommendations to be made by recommendation engine 107. Finally, specials/relevant advertisements 304 are shown in this exemplary screen shot in-line with the event recommendation. They may also appear as separate notifications, separate recommendations, or using any of the methods of data transmission known in the art or described hereto.

Exemplary screen shot 303 depicts additional details about the specific event recommendation, including the names of relevant friend recommendations 307, non-truncated special/advertisement details 308, and full list of interests for the event 309. These details and the others depicted in the exemplary screen shot 303 represent one embodiment, however many modifications and variations are also in the spirit of the invention as defined hereto.

Figure 4:
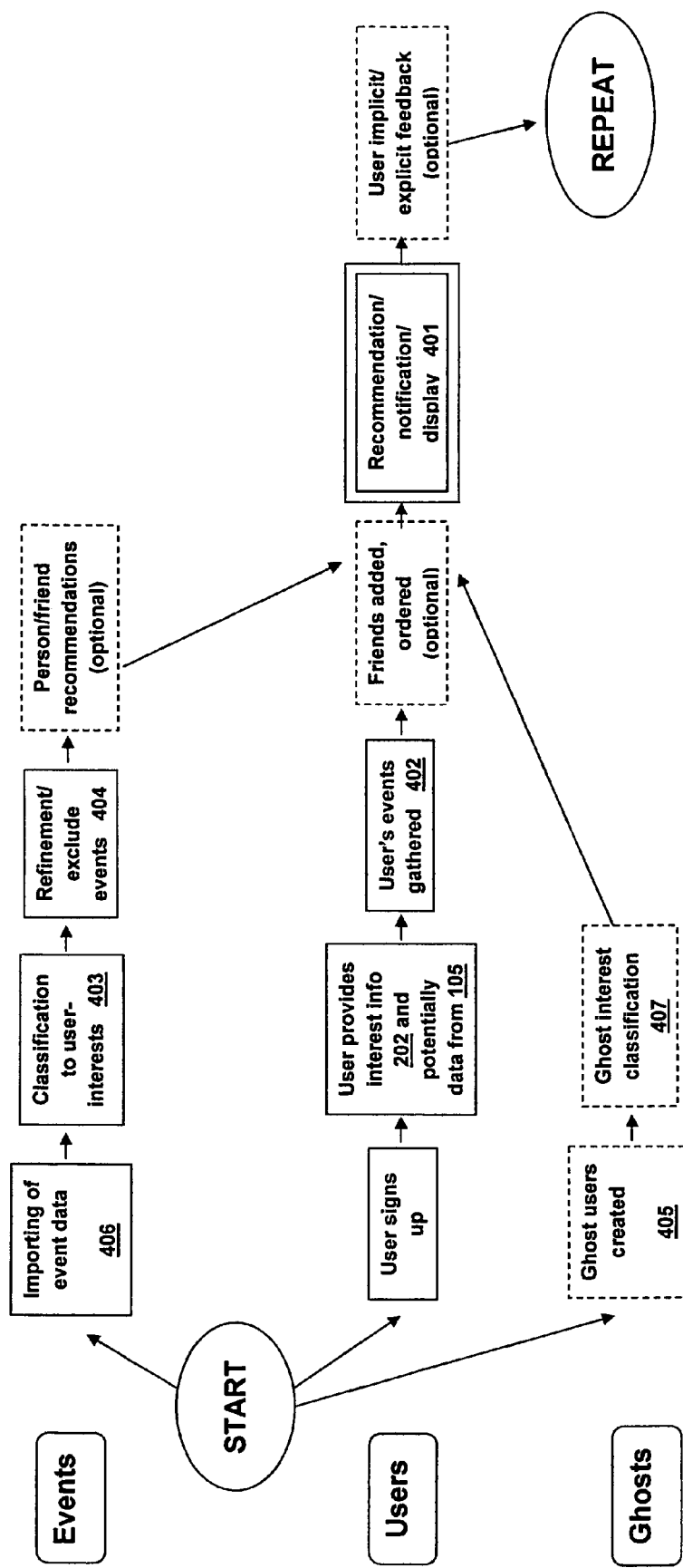
FIG. 4 is a flow diagram of an exemplary process for the importing/classification of data, display of relevant recommendations, and an optional feedback loop to improve future recommendations.

Referring now to FIG. 4, a flow diagram of an exemplary process for the importing/classification of data, display of relevant recommendations, and an optional feedback loop to improve future recommendations.

Multiple layers: events, users, and ghosts, can be processed in this exemplary process.

At step 406, event data can be imported from event data provider 106. This may occur via Application Programming Interfaces (API's), data scraping, user additions, or inferred by the network environment using methods such as locations/interests of users.

In this exemplary diagram, a user 103 explicitly provides user-interest info 202 using a mechanism similar to 301. Additional data may be optionally gathered, if permitted, from external social data provider(s) 105. Similarly, data from social data provider 105 generates ghost profiles 103a as relevant to user 103.

Matching/classification of events to real-world interests on the network environment 403 can occur via natural language processing, text classification, and/or be manually assisted. One skilled in the art will be aware of many software implementations to reach this goal.

Refinement and exclusion of events 404 also takes place, using thresholds—which can be user or system defined as described herein, to ensure the most meaningful events can be displayed to users 101 and 103. Factors considered by the exclusion analysis may include event size, guessed popularity, distance, and what the user 101 or 103 has attended or engaged with previously.

At optional step 407, network environment 104 creates relationships between user-interests on the network environment 104, and the ghost's guessed or explicitly stated interests via natural language processing, text classification, and or manual assistance. Once these associations are made, recommendation 107 can adequately map single outputs from event data provider 106, and their associated user-interests 202, with relevant ghosts who may be interested in also attending a particular event.

For example user 103 provides an interest in 'sushi' explicitly to network environment 104. When she engages with the service, ghost user 103a is also created, and it is explicitly determined this user has an interest in 'Japanese food'. When the event 'Sushi and Wine on the Beach' is upcoming, user 103 will see a recommendation 209 that may include ghost friend 103a based on the association of Japanese food with sushi, which occurred in process 407.

Other items depicted in FIG. 4 prior to step 401 can be handled by recommendation engine 107. Once recommendations 209 are synthesized, they can be displayed for the user or otherwise sent to the user according to methods of data transmission known in the art.

Optionally, other implicit or explicit feedback is gathered (click, attendance data, changing/updating user-interests, or other data points) to refine and improve recommendations 209 in the future.

Figure 5:
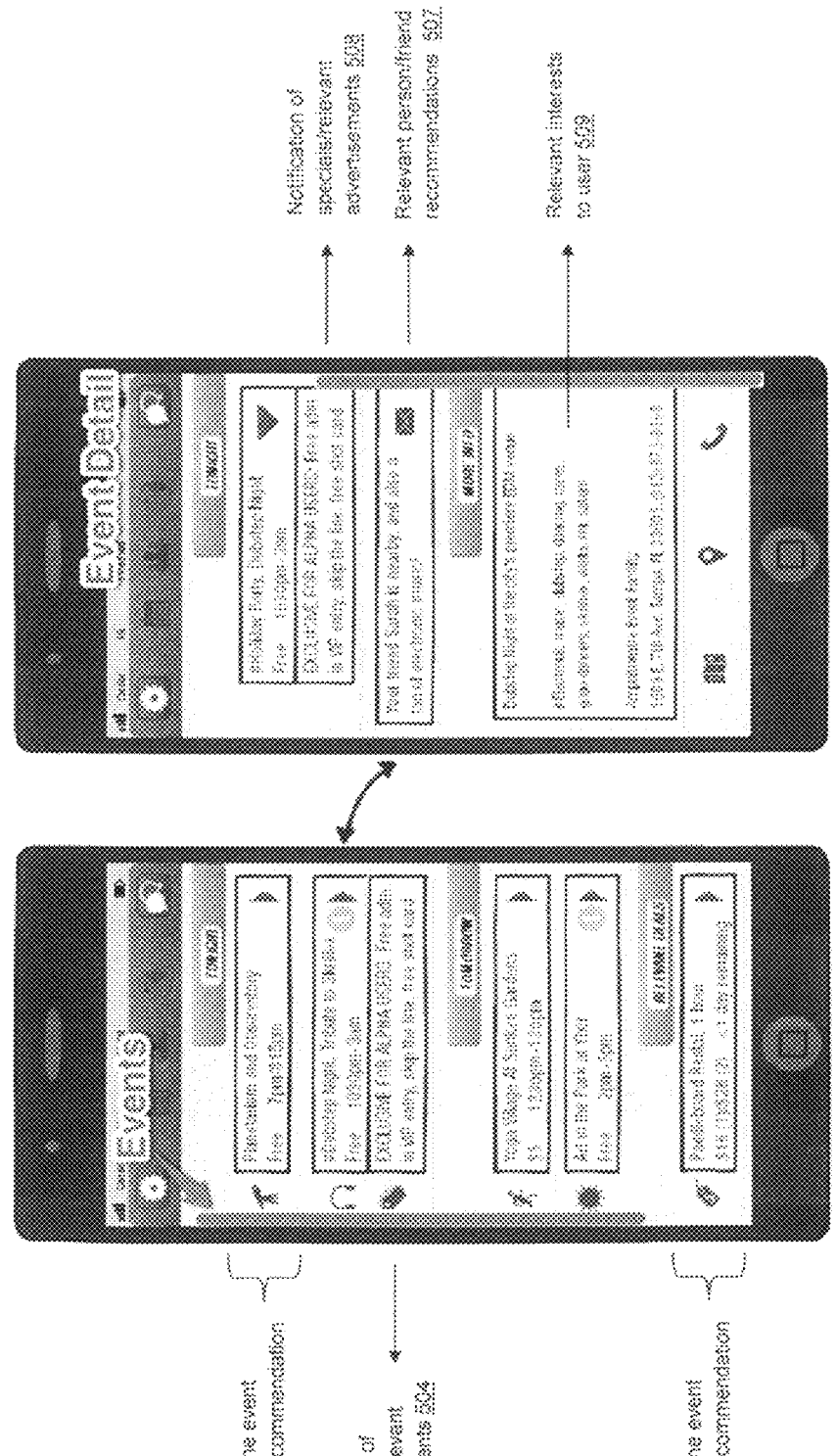
FIG. 5-FIG. 9 are additional embodiments of the present invention as described in U.S. Provisional Patent Application Ser. No. 61/794,283 filed on Mar. 15, 2013 and noted as FIGS. 1-2, and 6-8 respectively therein.

Referring now to FIG. 5, similar to FIG. 3 herein, and as noted as FIG. 1 in U.S. Provisional Patent Application Ser. No. 61/794,283 filed on Mar. 15, 2013, illustrates one embodiment of a 'feed' 502 of recommendations 209 from recommendation engine 107, displaying through the network environment 104 on a user device 102 to the viewing user 103. The user device 102 in this instance is also a mobile phone. The total number displayed may be limited by the significance analysis 206. For readability, the same descriptions and numbering as FIG. 3 are used.

This exemplary embodiment shows an optional expanded 'details' view 503 within the feed 502

Included are the elements from FIG. 3 in a different visual arrangement: specials/relevant advertisements 508, relevant person/friend recommendations 507, and event relevancy filtering 509

Figure 6:
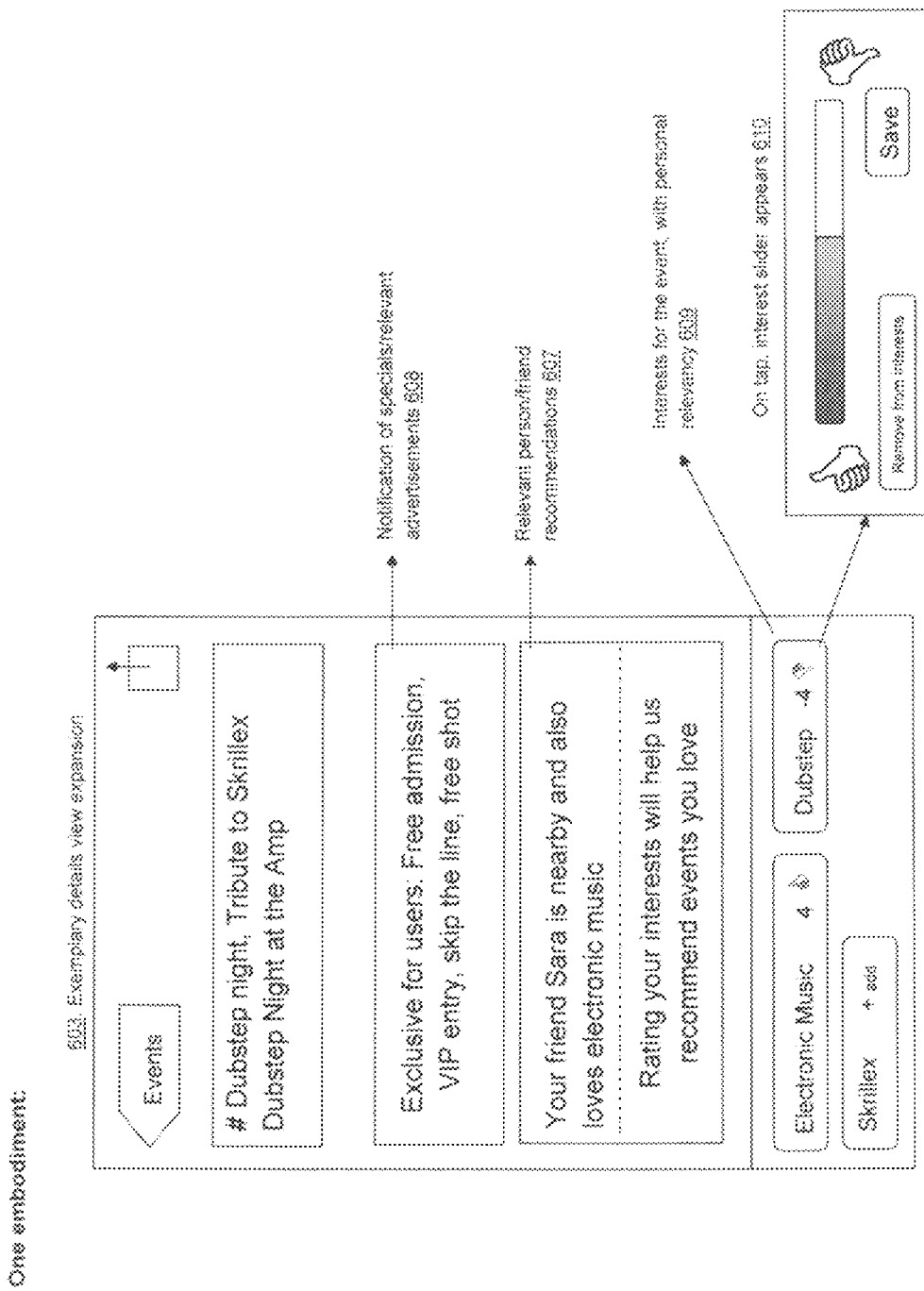

FIG. 6, as noted as FIG. 2 in U.S. Provisional Patent Application Ser. No. 61/794,283 filed on Mar. 15, 2013, illustrates another embodiment of an expanded 'details' view 603 of one recommendation 209. For readability, the same descriptions and numbering as FIG. 3 are used.

Included are the elements from FIG. 3 in a different visual arrangement: specials/relevant advertisements 608, relevant person/friend recommendations 607, and event relevancy filtering 609

Interest slider 610 highlights one embodiment of user importance ratings, an ingredient of event relevancy/popularity 203 as described herein.

Figure 7:
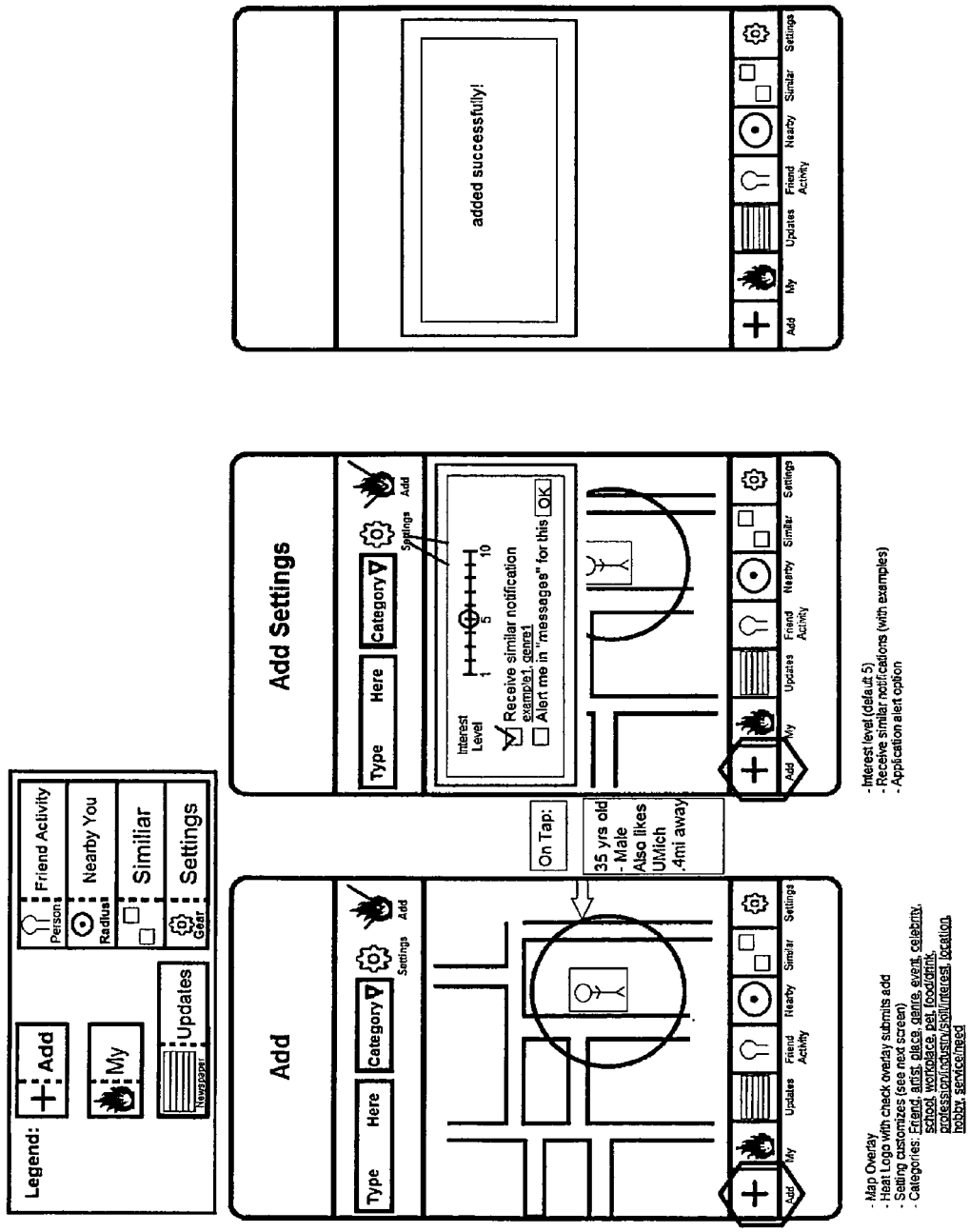

Referring now to FIG. 7, as noted as FIG. 6 in U.S. Provisional Patent Application Ser. No. 61/794,283 filed on Mar. 15, 2013, illustrates an early mockup screen shot of an alternative embodiment of a view allowing users to specify interest preferences 202

Embodiment depicts a map overlay with recommendations 209 displayed on the map, as the user indicates interest preferences 202.

Embodiment depicts interest slider feature 610 to specify importance of a particular interest.

Figure 8:
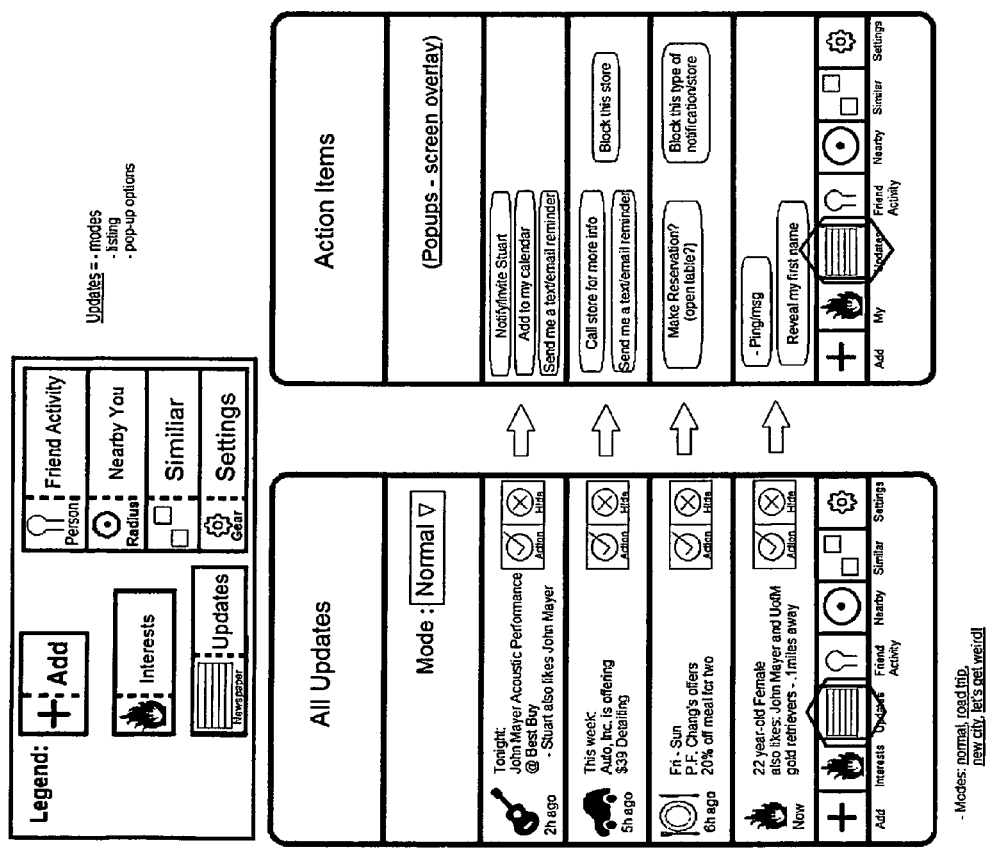

FIG. 8, as noted as FIG. 7 in U.S. Provisional Patent Application Ser. No. 61/794,283 filed on Mar. 15, 2013, illustrates an early mockup screen shot of an alternative embodiment of a 'feed' 302 of recommendations 209 from recommendation engine 107, displaying through the network environment 104 on a user device 102 to the viewing user 103. The user device 102 in this instance is also a mobile phone. The total number displayed may be limited by the significance analysis 206.

Included are each of the elements from FIG. 3 in a different visual arrangement

Figure 9:
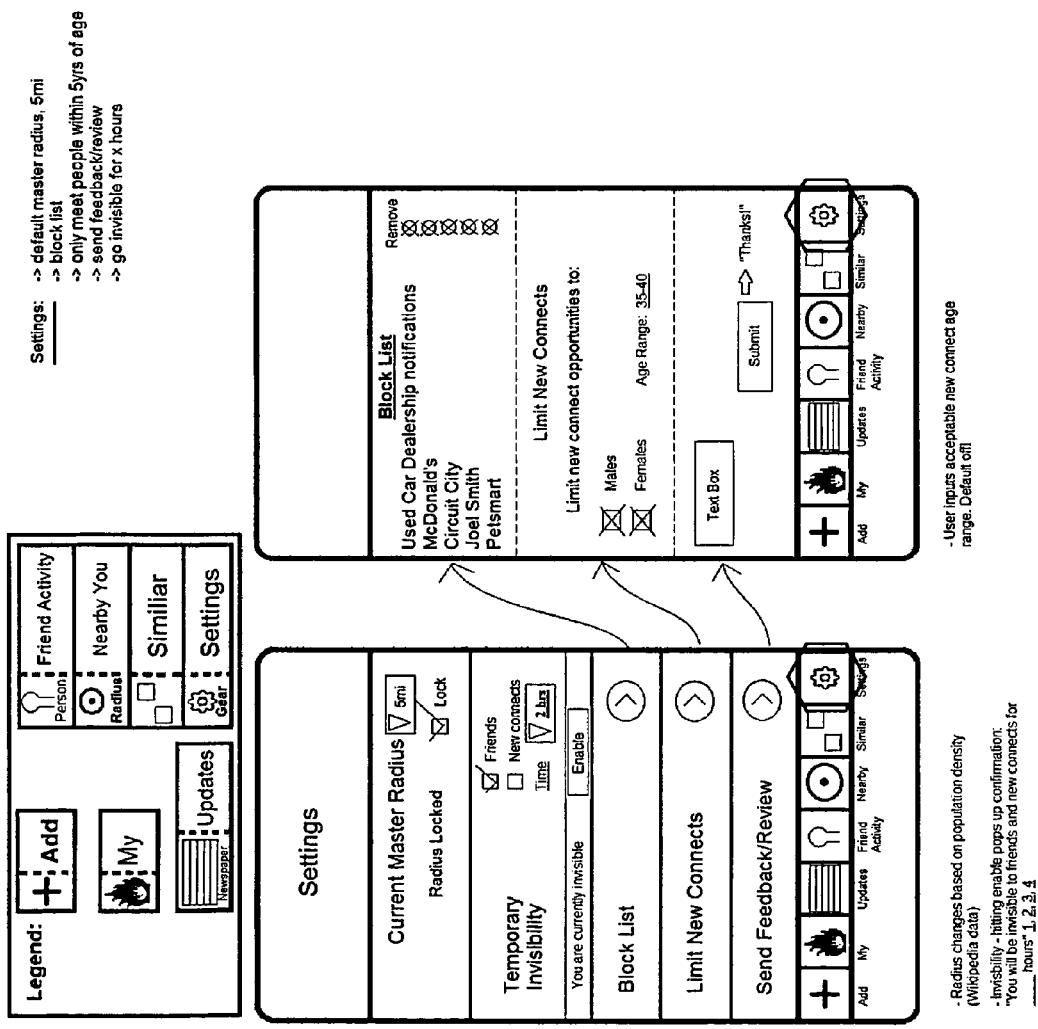

FIG. 9, as noted as FIG. 8 in U.S. Provisional Patent Application Ser. No. 61/794,283 filed on Mar. 15, 2013, illustrates an early mockup screen shot of a settings menu intended to be inputs for user interest relevancy 202 and engagement data 208 for recommendation engine 107 to arrive at recommendations 209.

Invention uses an improvement in the quality of data and the manner in which it is contextualized and joined, to offer a new, useful, and non-obvious improvement over the currently available user & event matching, recommendations, and/or real-life interactions fostered in current social networking solutions.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer processor implemented method to match recommendations to a user for an event, said method comprising:
   receiving or collecting, by a network environment, one or more portions of user data, event data, or social data from users or third party data sources via said network;
   whereby the network environment comprises one or more servers connected to one or more user devices via a network;
   identifying, by said network environment, one or more portions of user data, event data, or social data from users or third party data sources via said network;
   determining recommendations by calculating a relevancy score of said user data, said social data, or said event data for users when one or more of said data points of user, social, or event data exceeds one or more thresholds; wherein said determining is based upon a significance analysis, by a computer processor implemented method, which ranks said user data, said event data, or said social data to be of interest to one or more users based on awareness of entities, activities, interests, desires, or location;
   wherein said calculated relevancy score is greater than a threshold and includes said user data, said social data or said event data;
   categorizing said recommendations by applying a relevancy popularity analysis thereby narrowing down most relevant data based upon interests, activities, experiences, people, deals, specials, desired matchups, advertisements, or recommendations which have previously elicited engagement;
   matching said identified said user data, social data, or said event data based at least on said relevancy score for each categorized recommendation;
   determining one or more recommendation results based at least on said relevancy score for each categorized recommendation;
   transmitting to said user the one or more recommendation results based at least on said relevancy score for each categorized recommendation by displaying matched identified said user data, social data, or said event data based on calculated recommendations.

2. The method of claim 1, wherein said user data includes information about a user's real world explicitly or implicitly stated interests, disinterests, or desires.

3. The method of claim 2 wherein said social data may include information about users and ghost users' real world interests or disinterests.

4. The method of claim 3 wherein said user data further comprises a current, recent, last known, or estimated physical location of one more of said users.

5. The method of claim 4 wherein said user data further comprises a current, recent, last known, or estimated physical location of one or more ghost users.

6. The method of claim 5 wherein at least one of said thresholds is said user's physical location in relation to the event described by said event data.

7. The method of claim 5 wherein at least one of said thresholds is said user's physical location in relation to attributes of said social data.

8. The method of claim 1, wherein said event data comprises events, activities, experiences, people, deals, specials, desire matchups, or advertisements.

9. The method of claim 1, wherein the network environment receives and prioritizes said event data using said user data.

10. The method from claim 1, wherein the recommendations are further narrowed based on significance/relevance, or attendance/engagement.

11. The method from claim 1, wherein recommendations are presented to the user in a feedback mechanism, such as over the internet/intranet, via a dedicated or within a separate mobile/web/tablet application, via augmented reality layers, email, bluetooth, in-car audio/video/display systems, mobile tethering, mobile hotspots, near-field communication, or any transmission that offers relevant real-world content.

12. A system for a network environment to match recommendations to a user, said method comprising:
   one or more processors;
   and a memory coupled to the processor comprising instructions executable by the processors, the processors operable executing the instructions to:
      receiving or collecting, by a network environment, one or more portions of user data, event data, or social data from users or third party data sources via said network;
      whereby the network environment comprises one or more servers connected to one or more user devices via a network;
      identifying, by said network environment, one or more portions of user data, event data, or social data from users or third party data sources via said network;
      determining recommendations by calculating a relevancy score of said user data, said social data, or said event data for users when one or more of said data points of user, social, or event data exceeds one or more thresholds; wherein said determining is based upon a significance analysis, by a computer processor implemented method, which ranks said user data, said event data, or said social data to be of interest to one or more users based on awareness of entities, activities, interests, desires, or location;
      wherein said calculated relevancy score is greater than a threshold and includes said user data, said social data or said event data;
      categorizing said recommendations by applying a relevancy popularity analysis thereby narrowing down most relevant data based upon interests, activities, experiences, people, deals, specials, desired matchups, advertisements, or recommendations which have previously elicited engagement;
   matching said identified said user data, social data, or said event data based at least on said relevancy score for each categorized recommendation;
      determining one or more recommendation results based at least on said relevancy score for each categorized recommendation;
      transmitting to said user the one or more recommendation results based at least on said relevancy score for each categorized recommendation by displaying matched identified said user data, social data, or said event data based on calculated recommendations.

* * * * *